(12) United States Patent
 Suwald

(10) Patent No.: US 10,902,235 B2
(45) Date of Patent: *Jan. 26, 2021

(54) FINGERPRINT SENSOR MODULE

(71) Applicant: NXP B.V., Eindhoven (NL)

(72) Inventor: Thomas Suwald, Hamburg (DE)

(73) Assignee: NXP B.V., Eindhoven (NL)

( * ) Notice: Subject to any disclaimer, the term of this patent is extended or adjusted under 35 U.S.C. 154(b) by 98 days.

This patent is subject to a terminal disclaimer.

(21) Appl. No.: 15/978,100

(22) Filed: May 12, 2018

(65) Prior Publication Data

US 2018/0330138 A1 Nov. 15, 2018

(30) Foreign Application Priority Data

May 12, 2017 (EP) ...................................... 17170790

(51) Int. Cl.
 *G06K 9/28* (2006.01)
 *G06K 9/00* (2006.01)
 *G06F 3/044* (2006.01)
 *G06F 3/047* (2006.01)
 *G06K 19/07* (2006.01)

(52) U.S. Cl.
 CPC ........... *G06K 9/0002* (2013.01); *G06F 3/047* (2013.01); *G06F 3/0443* (2019.05); *G06K 19/0718* (2013.01)

(58) Field of Classification Search
 CPC .................................................... G06K 9/0002
 See application file for complete search history.

(56) References Cited

U.S. PATENT DOCUMENTS

| | | | |
|---|---|---|---|
| 6,028,773 | A | 2/2000 | Hundt |
| 10,579,850 | B2 | 3/2020 | Suwald |
| 10,579,851 | B2 | 3/2020 | Suwald |
| 2005/0139685 | A1 | 6/2005 | Kozlay |
| 2005/0141263 | A1* | 6/2005 | Umeda ................ G06K 9/0002 365/149 |
| 2006/0072355 | A1* | 4/2006 | Ebihara .................. G07C 9/257 365/149 |
| 2006/0113381 | A1 | 6/2006 | Hochstein et al. |
| 2009/0184408 | A1* | 7/2009 | Okada .................. G06K 9/0002 257/680 |
| 2010/0096725 | A1* | 4/2010 | Shi ..................... H01L 23/49822 257/531 |

(Continued)

FOREIGN PATENT DOCUMENTS

| | | |
|---|---|---|
| EP | 3 159 832 A1 | 4/2017 |
| WO | 2016/076562 A1 | 5/2016 |
| WO | WO-2017164791 A1 * | 9/2017 ......... G06K 9/00053 |

OTHER PUBLICATIONS

Extended European Search Report for Patent Appl. No. 17170790.4 (dated Feb. 19, 2018).

*Primary Examiner* — Brian Werner

(57) ABSTRACT

According to a first aspect of the present disclosure, a fingerprint sensor module is provided, comprising: an assembly comprising a substrate and a fingerprint sensor mounted on one side of the substrate; wherein the fingerprint sensor comprises a set of sensor elements and a measurement unit; and wherein the measurement unit is configured to concurrently measure capacitances on subsets of the set of sensor elements. According to a second aspect of the present disclosure, a corresponding method of producing a fingerprint sensor module is conceived.

19 Claims, 12 Drawing Sheets

(56) References Cited

U.S. PATENT DOCUMENTS

| | | |
|---|---|---|
| 2012/0182253 A1 | 7/2012 | Brosnan |
| 2016/0371527 A1 | 12/2016 | Suwald |
| 2017/0261459 A1* | 9/2017 | Meyer .................. G01N 27/226 |
| 2018/0060636 A1* | 3/2018 | Hong .................. G06K 9/00087 |
| 2018/0137324 A1* | 5/2018 | Riedijk .................... G01D 5/24 |
| 2018/0204036 A1* | 7/2018 | Akhavan Fomani ........................ G06K 9/0002 |
| 2018/0260060 A1* | 9/2018 | Zhang .................. G06K 9/0002 |

* cited by examiner

FINGERPRINT SENSOR MODULE

CROSS-REFERENCE TO RELATED APPLICATIONS

This application claims the priority under 35 U.S.C. § 119 of European patent application no. 17170790.4, filed on May 12, 2017, the contents of which are incorporated by reference herein.

FIELD

The present disclosure relates to a fingerprint sensor module. Furthermore, the present disclosure relates to a corresponding method of producing a fingerprint sensor module.

BACKGROUND

Today, many electronic devices and systems require a form of user authentication. For example, in a payment system, a fingerprint verification device may be used to initiate a payment and to authenticate a user. The fingerprint verification device may for example take the form of, or be embedded in, a smart card. More specifically, in addition to conventional user authentication via a personal identification number (PIN), a smart card may also include a fingerprint sensor for capturing the user's fingerprint. In that case, the captured fingerprint may be used to ascertain that the smart card is presented to a terminal by its rightful owner, for example. However, it may difficult to implement a fingerprint sensor in a fingerprint verification device of the kind set forth. Likewise, it may be difficult to implement fingerprint sensors in other fingerprint verification devices, for example wearable devices and Internet-of-Things (IoT) devices.

SUMMARY

According to a first aspect of the present disclosure, a fingerprint sensor module is provided, comprising: an assembly comprising a substrate and a fingerprint sensor mounted on one side of the substrate; wherein the fingerprint sensor comprises a set of sensor elements and a measurement unit; and wherein the measurement unit is configured to concurrently measure capacitances on subsets of the set of sensor elements.

In an embodiment, the substrate and the fingerprint sensor form a T-shaped assembly.

In an embodiment, the substrate is a polymer substrate or a glass substrate.

In an embodiment, the module further comprises a coating on the substrate.

In an embodiment, the fingerprint sensor is attached to the substrate by a solder layer, an electro-plating layer, or a foil.

In an embodiment, the measurement unit comprises a switched capacitor integrator.

In an embodiment, said subsets are mutually different subsets of the set of sensor elements.

In an embodiment, the measurement unit is configured to sequentially measure the capacitances on the mutually different subsets of the set of sensor elements.

In an embodiment, a fingerprint processing system comprises a module of the kind set forth and a processing unit configured to process the concurrently measured capacitances.

In an embodiment, the processing unit is further configured to derive a capacitance on one or more individual sensor elements from said concurrently measured capacitances.

In an embodiment, the processing unit is a microcontroller.

In an embodiment, a smart card comprises a fingerprint processing system of the kind set forth.

In an embodiment, the smart card further comprises a plurality of wires embedded in a layer of said card, wherein said wires connect the fingerprint processing module with other components of the card.

In an embodiment, one or more endings of said wires have a square spiral shape.

According to a second aspect of the present disclosure, a method of producing a fingerprint sensor module is conceived, the method comprising providing the module with: an assembly comprising a substrate and a fingerprint sensor mounted on one side of the substrate; wherein the fingerprint sensor comprises a set of sensor elements and a measurement unit; and wherein the measurement unit is configured to concurrently measure capacitances on subsets of the sensor elements.

DESCRIPTION OF DRAWINGS

Embodiments will be described in more detail with reference to the appended drawings, in which.

DESCRIPTION OF EMBODIMENTS

Figure 1:
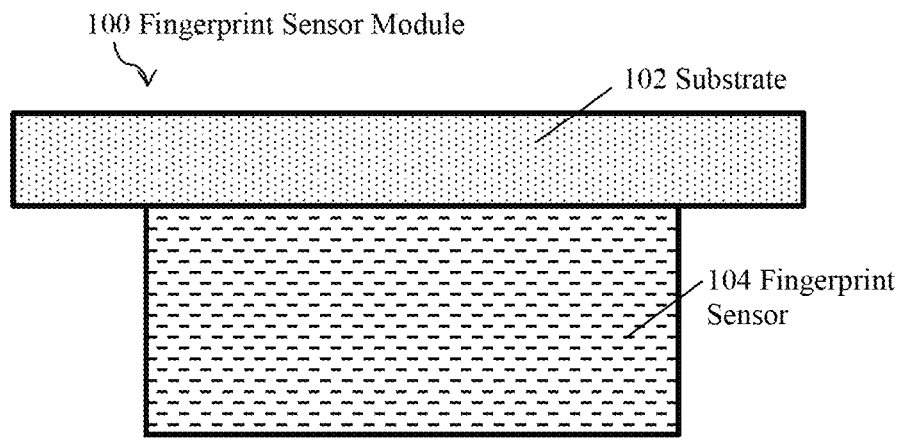
FIG. 1 shows an illustrative embodiment of a fingerprint sensor module.

FIG. 1 shows an illustrative embodiment of a fingerprint sensor module 100. The fingerprint sensor module 100 comprises a fingerprint sensor 104 mounted on one side of a substrate 102. The fingerprint sensor 104 and substrate 102 form an assembly. In accordance with the present disclosure, the fingerprint sensor 104 comprises a set of sensor elements and a measurement unit (not shown). The measurement unit is configured to concurrently measure capacitances on subsets on the set of sensor elements. By providing an assembly of the kind set forth, the fingerprint sensor module 100 can easily be integrated into compact or thin products, such as smart cards. In order to further facilitate the integration into such products, the fingerprint sensor may be mounted underneath the substrate. Furthermore, the loss of sensitivity that may be caused by the substrate on the sensor's active area, may be compensated by concurrently measuring capacitances on subsets on the set of sensor elements. The sensor elements may for example be sensor plates on which a capacitance can be measured; this capacitance changes when a finger comes into proximity. Concurrently measuring the capacitances on a plurality of such plates increases the sensitivity of the sensor; the individual capacitances (i.e., the capacitance on individual plates) can be derived from the total capacitance on the subset by a calculation. This principle has been explained in the European patent application titled "Fingerprint Processing System and Method", application number EP17154372.1, filed on 2 Feb. 2017 by applicant NXP B.V. In an embodiment, as shown in FIG. 1, the substrate 102 and the fingerprint sensor 104 form a T-shaped assembly. Thereby, the integration of the fingerprint sensor module 100 into the aforementioned products is further facilitated. Furthermore, the substrate may be a polymer substrate or a glass substrate.

The integration of a capacitive fingerprint sensor into, for example, a smart card requires costly manufacturing processes. This is mainly caused by the fact that a coated sensing surface should be exposed to a card holder's finger. To meet this requirement, a complex module packaging of the fingerprint sensor is required to ensure that the sensor is integrated into the card in such a way that it withstands mechanical stress. A module package often consists of a polymer substrate mounted underneath a sensor die; the sensor die is then wire-bonded to the substrate and the sensor die is over-molded by a molding compound to protect the bond-wires. For integration of said module into the smart card a preassembly comprising a print bottom substrate, a core substrate and a printed circuit board (PCB) interconnection substrate may have to be manufactured. Said pre-assembly requires a cavity for accommodating the module. This cavity, however, may be difficult to create.

More specifically, in an example, in a first assembly step the sensor die may be assembled to the substrate utilizing die attach foil and wire-bonding. In a second assembly step the assembled sensor die is over-molded utilizing a dedicated mold chase tool, resulting in the fingerprint sensor module. In a third assembly step a pre-assembly may be manufactured that may comprise a first substrate (core substrate) and a second substrate (PCB substrate). The second substrate may provide attached or embedded electrical interconnection. The first and second substrate may provide a cavity for accommodating the sensor module. In a fourth assembly step the module may be assembled to the pre-assembly by e.g. flex-bumps. In a fifth assembly step a lamination stack comprising a substrate (print bottom), the pre-assembly comprising the fingerprint module and another substrate (print top) having a cavity configured to fit the fingerprint modules outline may be assembled. It may be required to apply precision positioning for the print top substrate layer as there should not be a visible gap between the sensor module and the print top substrate. This last requirement may be difficult to achieve as the print top substrate layer may exhibit stretch or shrink that is much higher than the assembly tolerances required to achieve the specified small gap between the fingerprint module and the print top layer. This approach makes the integration of a fingerprint sensor into a smart card complex and expensive. In comparison, the presently disclosed fingerprint sensor module enables an easy and less expensive integration into a smart card.

Figure 2:
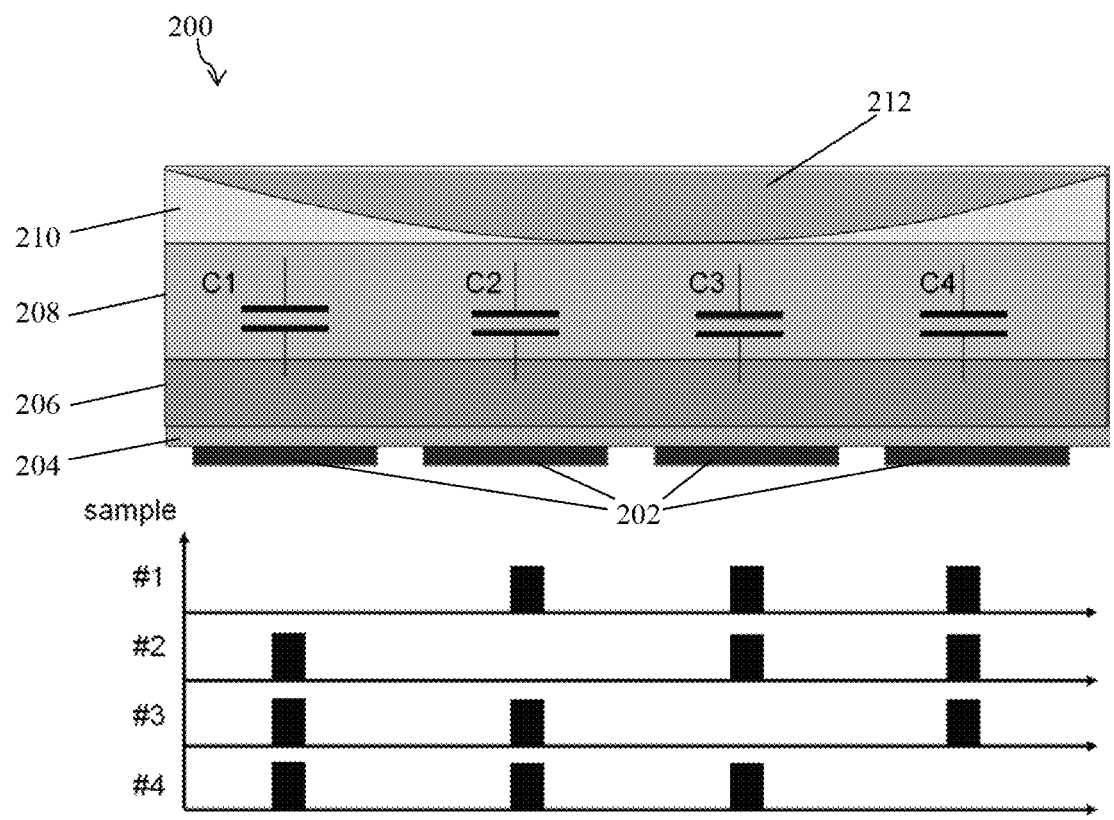
FIG. 2 shows another illustrative embodiment of a fingerprint processing module.

FIG. 2 shows another illustrative embodiment of a fingerprint processing module 200. The fingerprint sensing module 200 comprises a set of sensor plates 202 (i.e., sensor elements) coupled to a nitride layer 204. The nitride layer 204 is coupled to a glue-layer 206. The glue-layer 206 is coupled to a substrate 208. The fingerprint processing module 200 may form part of a smart card, for example. The substrate 208 may be touched by a finger 212. It is noted that more insulating layers may be present between the finger 212 and the nitride layer 204. Furthermore, a coating may be present between the finger 212 and the substrate 208. Furthermore, it is noted that the term "finger" includes all parts of a finger, such as the finger's papillae. Thus, more precisely, the substrate 208 (or the coating, as the case may be) may be touched by the finger's ridges. At locations where the finger 212 does not touch the substrate 208, an air gap 210 may exist. A measurement unit (not shown) may measure the capacitances present on the sensor plates 202 in order to detect the touching of the substrate 208 by the finger 212 at the specific locations of the plates 202. More specifically, when the substrate 208 is touched at a specific location, the capacitance on the sensor plate 202 at that location will change since the finger acts as a counter electrode, and the air gap 210 is absent or small at that location. Thus, the variance in the air gap between the finger's surface and the sensor may indicate the depth of the fingerprint's papillae. By registering and processing the changed capacitances, an image of the fingerprint may be formed.

In accordance with the present disclosure, capacitances on subsets of the set of sensor plates 202 are measured concurrently, as shown in the lower part of FIG. 2. For instance, in a first time slot (sample number 1) the capacitances C2, C3, and C4 are measured. In a second time slot (sample number 2) the capacitances C1, C3, and C4 are measured. In a third time slot (sample number 3) the capacitances C1, C2, and C4 are measured. In a fourth time slot (sample number 4) the capacitances C1, C2, and C3 are measured. Thus, instead of sequentially measuring the individual capacitances C1, C2, C3, and C4, capacitances {C2, C3, C4} are measured concurrently, capacitances {C1, C3, C4} are measured concurrently, capacitances {C1, C2, C4} are measured concurrently, and capacitances {C1, C2, C3} are measured concurrently. In this way, the sensitivity of the sensor may be increased. In particular, the size of a sensor plate determines, among other parameters, the capacitance between said sensor plate and the finger's surface. The capacitance of such a sensor plate may e.g. be in the range of 0.5 fF to 20 fF when the finger's surface is in proximity. By concurrently measuring the capacitances on subsets of the sensor plates, a "virtual sensor plate" is created, which has a larger size than the individual sensor plates 202. The higher capacitance measured on this "virtual sensor plate" (i.e., higher than the individual capacitances on the sensor plates 202) mitigates the attenuation of the measurable effects caused by the substrate 208 and other layers above the active sensor area.

Figure 3A:
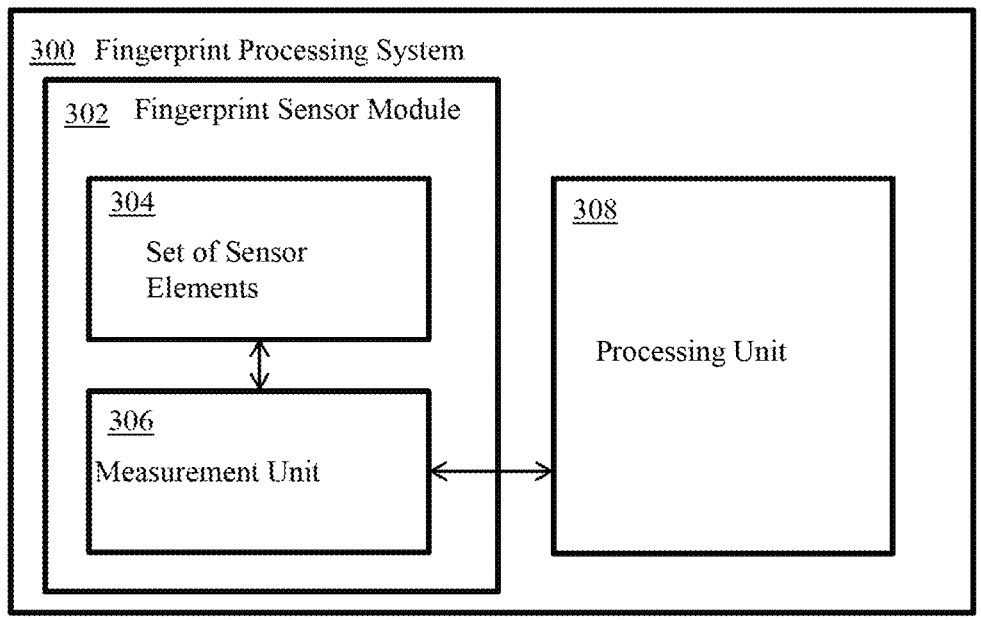
FIG. 3A shows an illustrative embodiment of a fingerprint processing system.

FIG. 3A shows an illustrative embodiment of a fingerprint processing system 300. The fingerprint processing system 300 comprises a fingerprint sensor module 302 and a processing unit 308. In a practical implementation, the processing unit 308 is a microcontroller. The fingerprint sensor module 302 comprises a set of sensor elements 304 operatively coupled to a measurement unit 306. The processing unit 308 is operatively coupled to the measurement unit 306. In accordance with the present disclosure, the measurement unit 306 is configured to measure one or more capacitances on the sensor elements 304. In particular, a measurable capacitance may develop on a sensor element (e.g., a sensor plate) when a voltage is applied to said element and an external object, such as a finger, comes into proximity of said element. In this scenario, the sensor element may act as an electrode and the external object may act as a counter electrode. More specifically, in accordance with the present disclosure, the measurement unit 306 is configured to concurrently measure capacitances on subsets of the set of sensor elements 304. The processing unit 308 is configured to process measured capacitances, in particular concurrently measured capacitances.

Figure 3B:
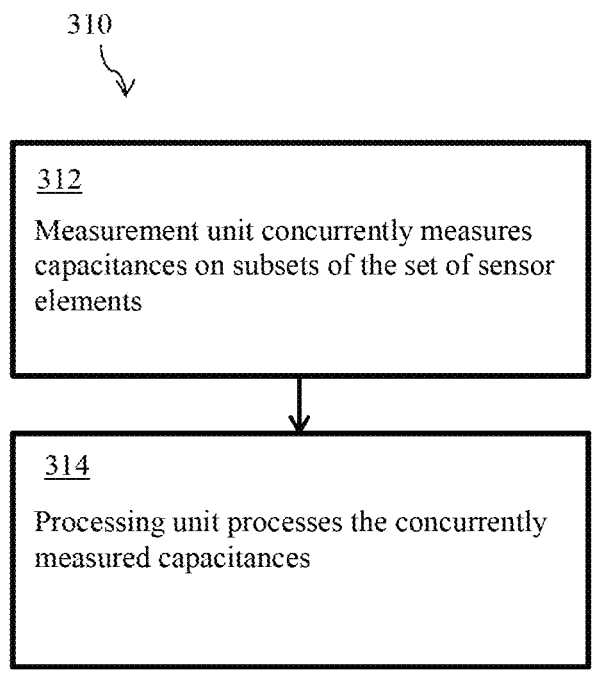
FIG. 3B shows an illustrative embodiment of a fingerprint processing method.

FIG. 3B shows an illustrative embodiment of a corresponding fingerprint processing method 310. The method 310 comprises, at 312, that the measurement unit 306 concurrently measures capacitances on subsets of the set of sensor elements 304. Furthermore, the method 310 comprises, at 314, that the processing unit 308 processes the capacitances concurrently measured by the measurement unit 306.

Figure 3C:
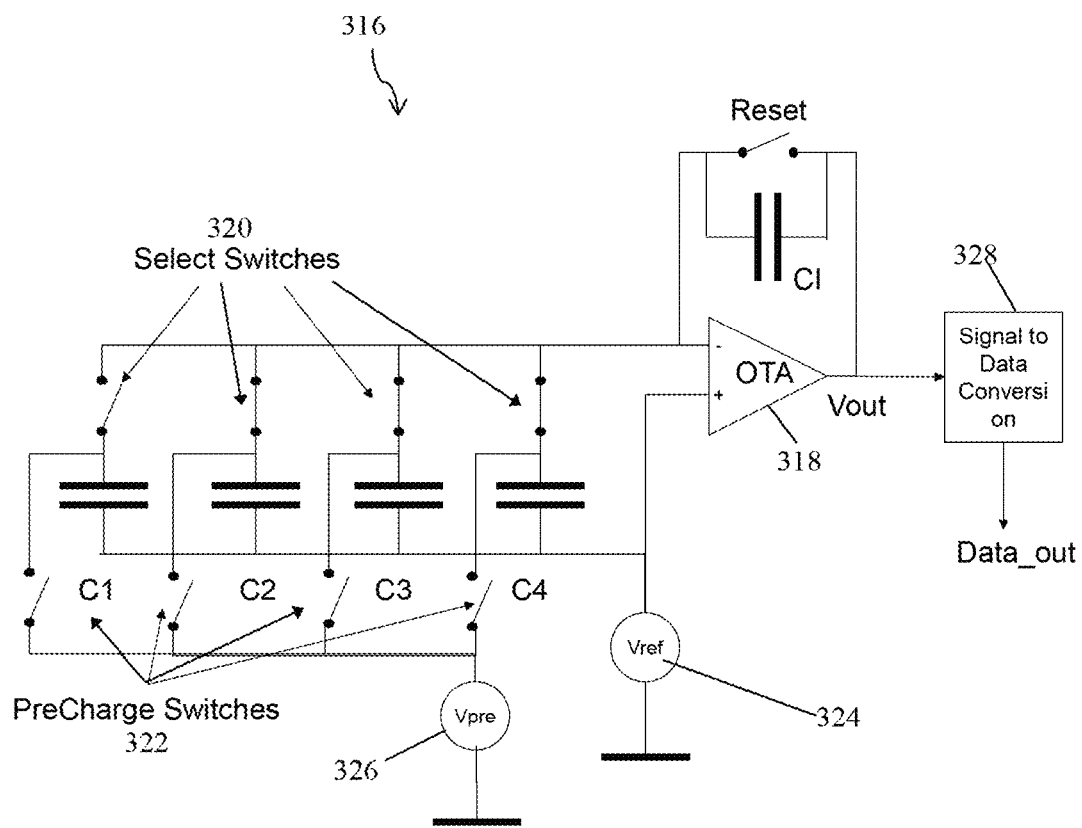
FIG. 3C shows an illustrative embodiment of a switched capacitor integrator.
Figure 3D:
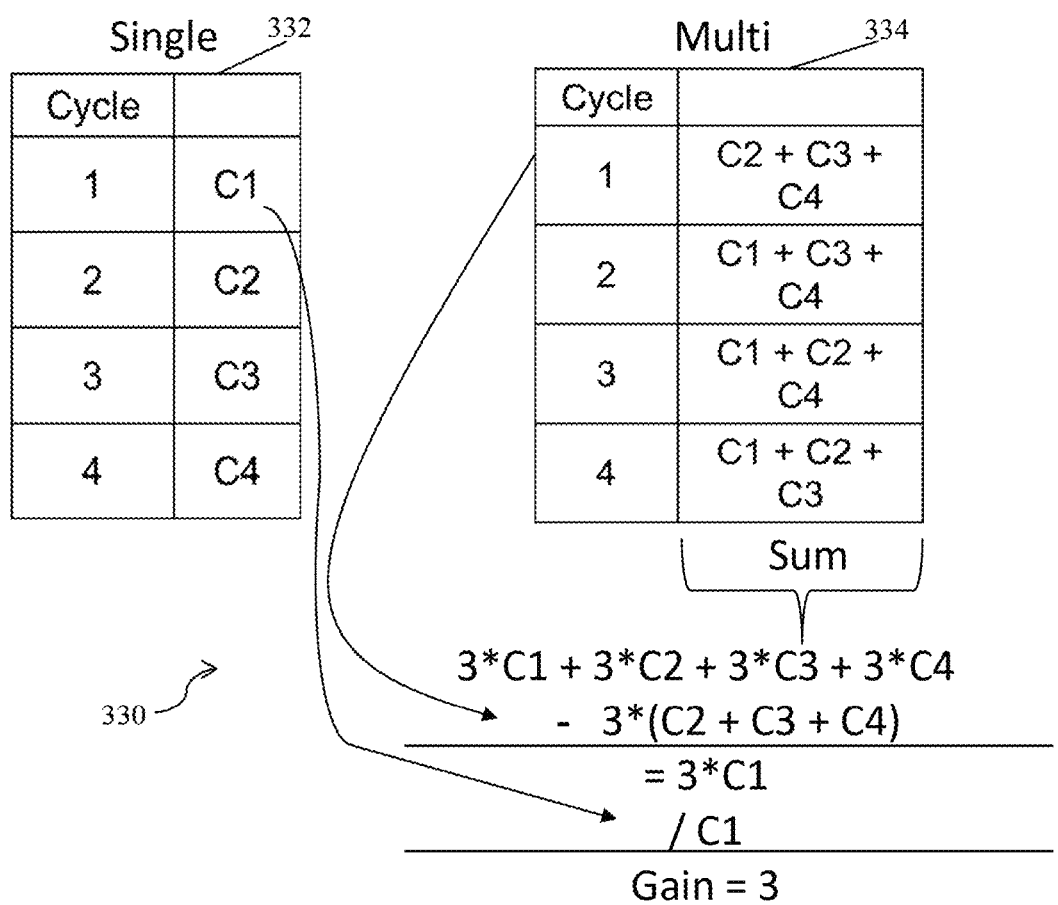
FIG. 3D shows an illustrative embodiment of a sampling principle.

FIG. 3C shows an illustrative embodiment of a switched capacitor integrator 316. In particular, in one or more embodiments, the measurement unit comprises the switched capacitor integrator 316. The switched capacitor integrator 316 facilitates the implementation of a sampling principle as illustrated in FIG. 3D. The switched capacitor integrator 316 comprises an operational transconductance amplifier (OTA) 318, select switches 320, pre-charge switches 322, a reference voltage source 324, a pre-charge voltage source 326, and a signal-to-data conversion unit 328. In particular, the creation of sum samples is realized by the switched capacitor integrator 328. The select switches 320 facilitate the selection of sensor elements that should contribute to a sum sample in a given cycle or sampling step.

FIG. 3D shows an illustrative embodiment of a sampling principle 330 in accordance with the present disclosure. The left side of FIG. 3D shows the evaluation 332 of single sensor elements. In other words, the left side of FIG. 3D shows how individual capacitances C1, C2, C3, and C4 are measured sequentially. For example, the individual capacitances may be measured in subsequent cycles or sampling steps. The right side of FIG. 3D shows the concurrent evaluation 334 of sensor elements in accordance with the present disclosure. In other words, the right side of FIG. 3D shows how capacitances on subsets of sensor elements are measured concurrently. More specifically, in a first cycle or sampling step capacitances {C2, C3, C4} are measured concurrently, in a second cycle or sampling step capacitances {C1, C3, C4} are measured concurrently, in a third cycle or sampling step capacitances {C1, C2, C4} are measured concurrently, and in a fourth cycle or sampling step capacitances {C1, C2, C3} are measured concurrently.

The sampling principle 330 shown in FIG. 3D applies to a set that comprises four sensor elements. Due to that fact that in the respective steps one sensor element is not evaluated the sum of all sum samples amounts to (4−1)=3 multiplied by the sum of all capacitances. It is noted that the term "sum sample" refers to the concurrently measured capacitances in a particular step. By subtracting (4−1)=3 multiplied by one sum sample (e.g. C2+C3+C4, as shown in FIG. 3D) from the sum of all sum samples the value of (4−1)=3 multiplied by an individual capacitance is obtained (e.g. 3 C3, as shown in FIG. 4). By dividing this value by (4−1)=3, the value of the individual capacitance (C3) is obtained. Thus, specifically, the value of the individual capacitance that is not included in the sample sum under consideration is obtained. The gain factor in this example is (4−1)=3. For a large set of sensor elements (e.g., n=96) the gain factor is significant (96−1)=95.

Figure 4A:
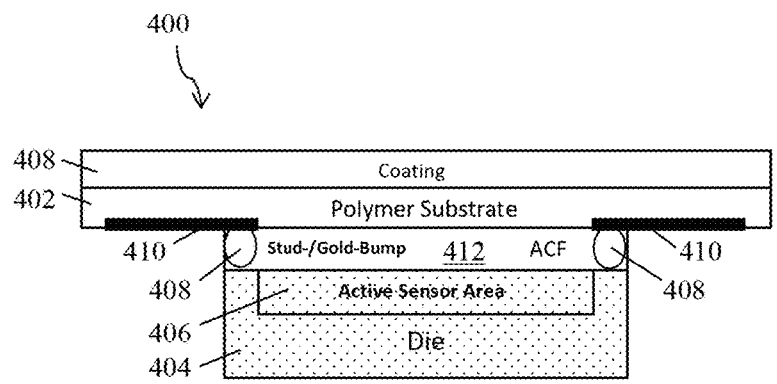
FIG. 4A shows a further illustrative embodiment of a fingerprint sensor module.
Figure 4B:
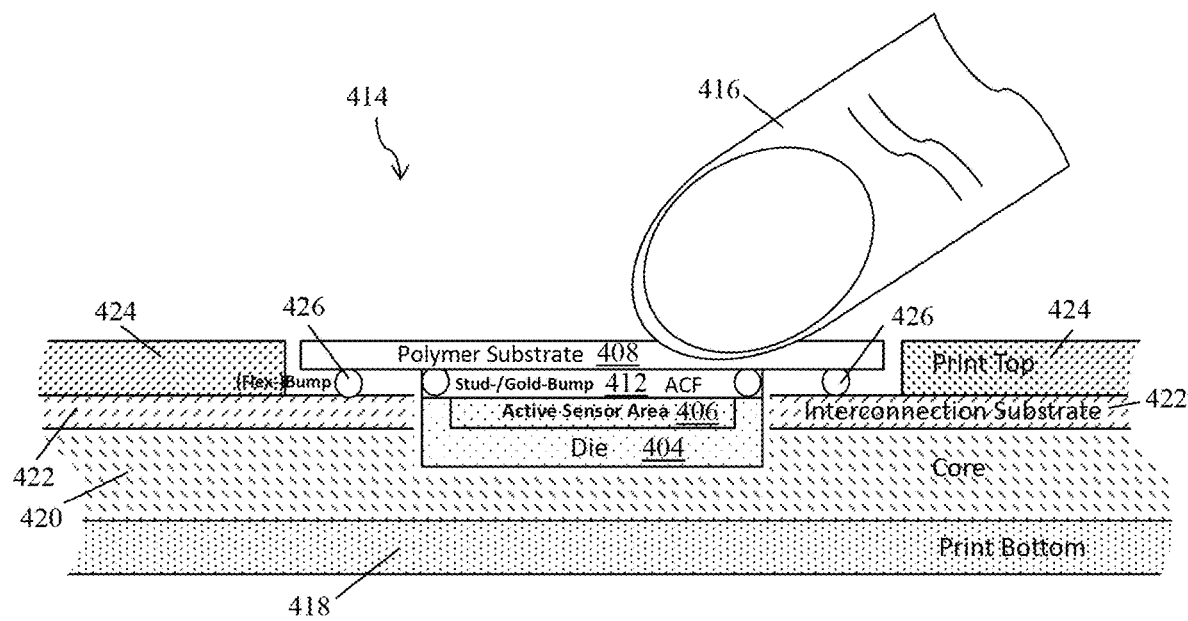
FIG. 4B shows a further illustrative embodiment of a fingerprint sensor module.

FIGS. 4A and 4B show further illustrative embodiments of a fingerprint sensor module 400, 414. In particular, FIG. 4A shows an example of an implementation of the fingerprint sensor module 400, comprising the substrate-sensor assembly and a coating 408 on the substrate 402. Thus, in an embodiment, the module 400 comprises a coating on the substrate, which increases the module's scratch resistance. FIG. 4B shows the module 414 integrated into a smart card.

In accordance with the present disclosure, the active sensor area 406 is not exposed to the finger 416. Instead, a sensor with enhanced sensitivity is mounted underneath a polymer substrate 408 that is positioned between the active sensor area 406 and the finger 416. Alternatively, the substrate 408 may be a glass substrate. This sensor does not need an additional drive voltage electrode (bezel). The substrate 408 may be configured as 35 mm index tape. It is not necessary to provide a galvanic interface to the finger 416. As shown in FIG. 4A, the fingerprint sensor (die 404 including active sensor area 406) is part of an assembly or module package having a T-shape. This T-shape facilitates the integration of the module into a smart card. The module 400 comprises a polymer substrate 402 and an interconnectivity layer 410 attached thereto, with the sensor die 404 assembled underneath said substrate 402 such that it may be electrically connected to said interconnectivity layer 410 using stud- or gold-bumps 408, and the active sensor area 408 of the fingerprint sensor die 404 facing the substrate 402. Any remaining volume between the sensor die's surface and the substrate 402 may be filled up by a suitable material, which may be an underfill compound.

In an embodiment, the die 404 may be soldered with low-temperature solder to the polymer substrate 402 and the gap between the die 404 and the substrate 402 may be filled completely by said underfill compound. In an embodiment, the die 404 may be assembled by electro-plating to the polymer substrate 402 and the gap between the die 404 and the substrate 402 may be filled completely by said underfill compound. In an embodiment, the die 404 may be assembled by die attach foil in combination with suitable bumps, e.g. stud-bumps, to the polymer substrate 402 and the gap between the die 404 and the substrate 402 may be filled completely by said underfill compound. In an embodiment, the die 404 may be assembled by a suitable assembly method that may e.g. be a combination of die attach foil and stud-bumps to a paper substrate, and the gap between the die 404 and the substrate may be filled completely by said underfill compound.

Figure 7:
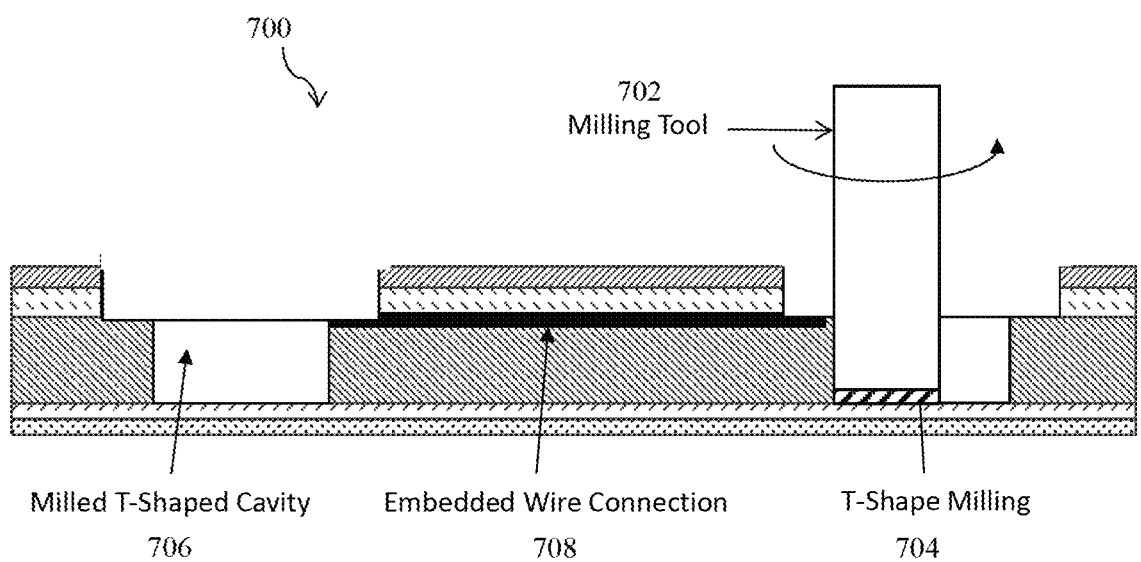
FIG. 7 shows another cross-section of a card.
Figure 8:
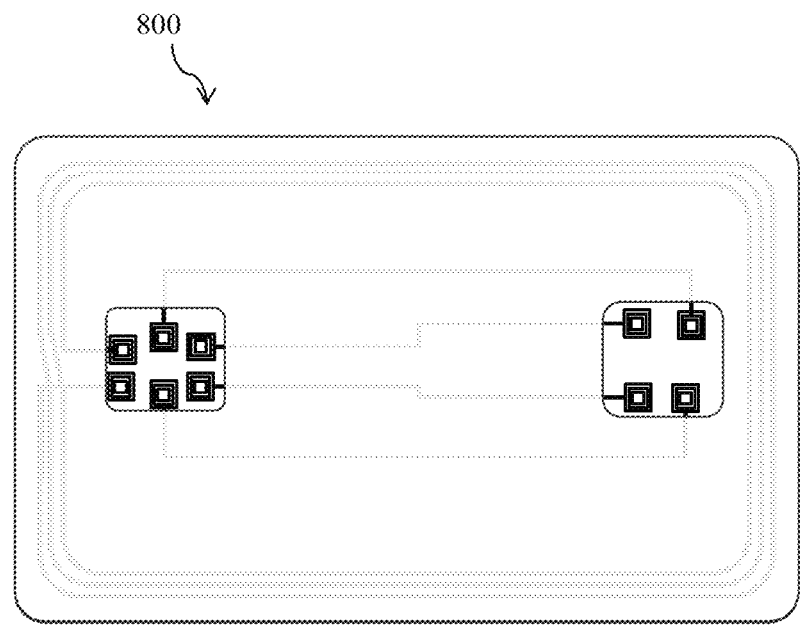
FIG. 8 shows another illustrative embodiment of a smart card.
Figure 16:
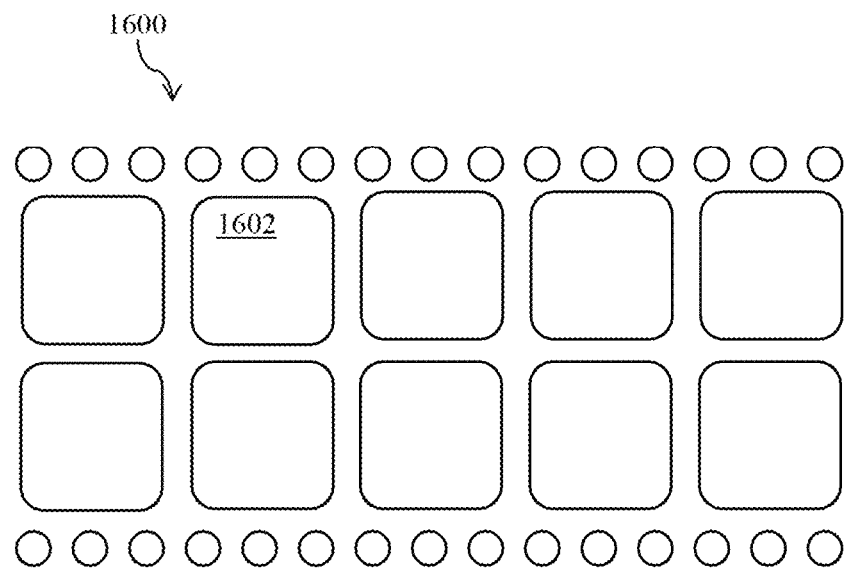
FIG. 16 shows an illustrative embodiment of a tape with sensor dies.

The sensor die 404 may be assembled to the substrate 402 by any suitable method providing galvanic contact between the die 404 and the interconnection layer 410 on the lower side of the substrate 402. Since a drive voltage electrode is not necessary, the polymer substrate 402 only has one interconnection layer 410 and does not require a second interconnection layer or VIAs between a first and second interconnection layer. Thus, costs may be saved. For integration of said fingerprint sensor module 400, 414 into a smart card, a first manufacturing step may comprise producing a preassembly comprising print bottom substrate 418, a core substrate 420, an interconnection substrate 422 and a print top substrate 424. The interconnection substrate 422 may be configured to electrically interconnect the fingerprint sensor module 400, 414 to at least one other module (not shown) integrated in said smart card. In a second manufacturing step, a T-shaped cavity configured to accommodate the T-shaped fingerprint sensor module 400, 414 may be formed in the preassembly. The forming process may be controlled such that the interconnection layer of the printed circuit board (PCB) substrate is made available for module assembly. The second manufacturing step is illustrated in FIG. 7 and FIG. 8. In a third assembly step said T-shaped fingerprint sensor module 400, 414 may be assembled into the cavity of the pre-assembly utilizing e.g. flex bumps, anisotropic conductive film (ACF), anisotropic conductive adhesive (ACA) or a soldering process to connect the module 400, 414 to the PCB interconnection layer. To fix the module 400, 414 permanently in the formed cavity an additional fixture method, e.g. hot-melt, may be applied. No air needs to be contained underneath the module 400, 414, so that any available cavity volume underneath the module 400, 414 may be filled by an adhesive such as hot-melt. Furthermore, the sensor does not need to be exposed to a combination of high temperature, high pressure and high electrostatic-discharge (ESD) stress as is normally the case during smart card lamination. Another advantage is that the preassembly may be manufactured in a standard card manufacturing process that does not require investment in specific tooling. Furthermore, the presently disclosed fingerprint sensor module can be integrated into a smart card in the same way as other processing modules, for example ISO7816 contact-modules. Thus, no special integration method needs to be applied, and the smart card can be produced with greater efficiency. The fingerprint sensor module can be provided to card manufacturers on 35 mm index-tape as shown in FIG. 16, i.e. in the same way as ISO7816 contact-modules.

Figure 5A:
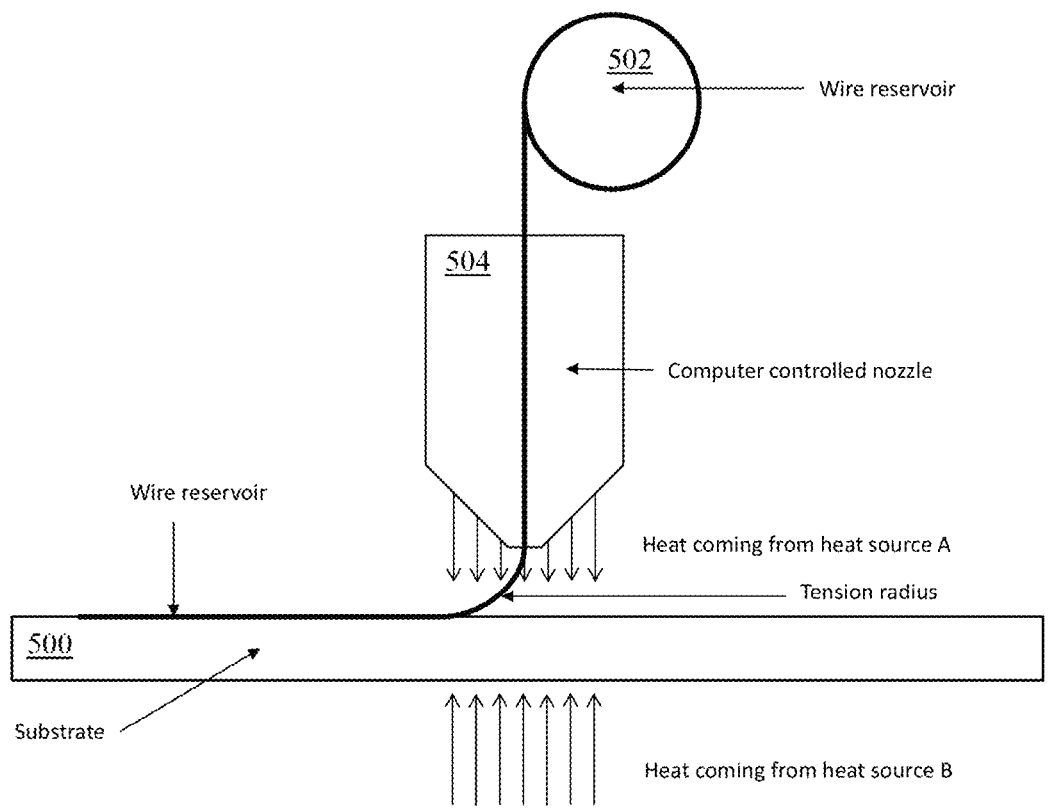
FIG. 5A shows an illustrative embodiment of a process for embedding wires.

FIG. 5A shows an illustrative embodiment of a process for embedding wires. In an embodiment of a smart card, the card comprises a fingerprint processing module of the kind set forth, and a plurality of wires embedded in a layer of said card, wherein said wires connect the fingerprint processing module with other components of the card. Thus, the interconnections within the card body may not be formed by an etched PCB but by embedded wires; this may facilitate the manufacturing of the card and result in cost savings. The process comprises at least one nozzle 504 supplying at least one wire from a wire reservoir 502, a heating system to locally heat up the substrate 500 under the at least one nozzle 504 and an application system that applies the supplied at least one wire to the card surface melted by said heating system.

Figure 5B:
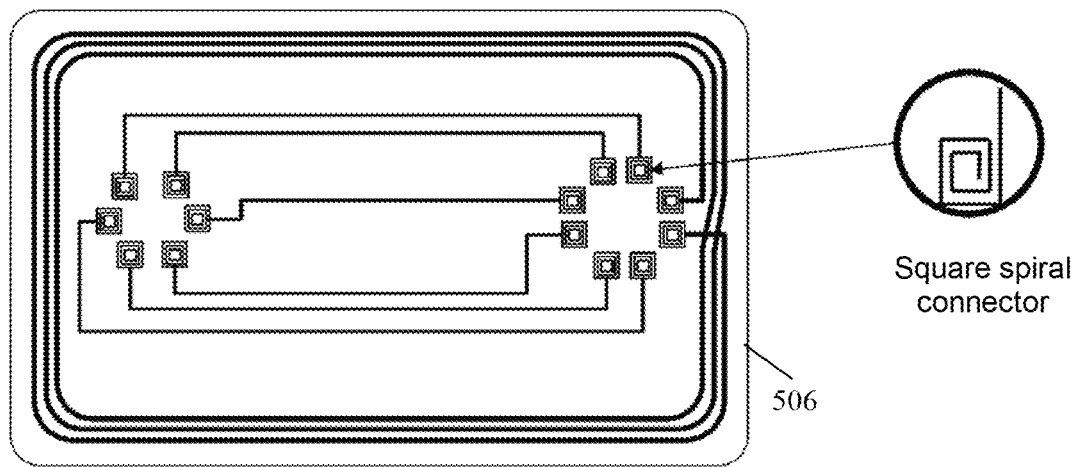
FIG. 5B shows an illustrative embodiment of a smart card.

FIG. 5B shows an illustrative embodiment of a smart card 506 having interconnections formed by the process shown in FIG. 5A. In an embodiment, the embedded wires may comprise endings that have a square spiral shape. This may facilitate connected the card modules to the wires; the square spiral connectors have a large interface area and they may contribute to achieving a high mechanical robustness of the module integration process. FIG. 5B shows that the card 506 has two sets of square spiral connectors: one set may be connected to a fingerprint sensor module of the kind set forth, while the other set may be connected to processing module. The processing module may for example contain a processing unit (e.g., microcontroller) of the kind set forth, a secure element, a power management unit and an energy-harvesting unit. In an embodiment, the interconnection may be printed as conductive ink onto the substrate, thus forming an interconnection substrate.

Figure 6:
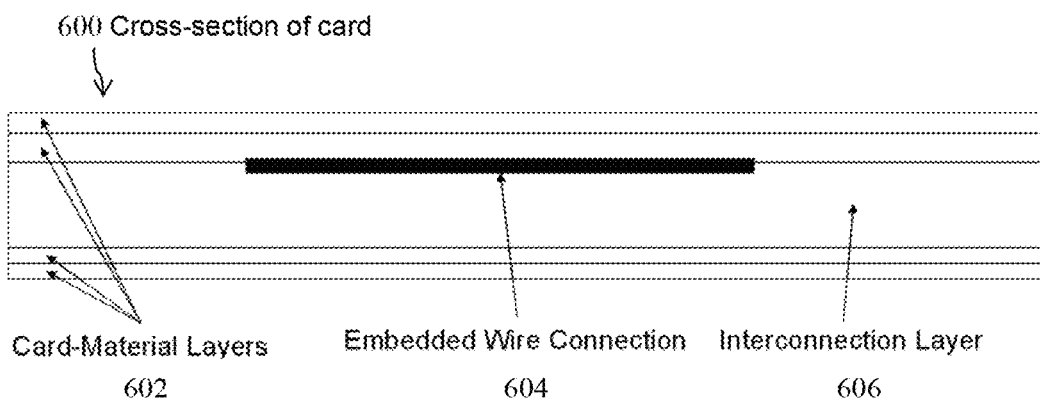
FIG. 6 shows a cross-section of a card.

FIG. 6 shows a cross-section 600 of a card. The aforementioned interconnection substrate may be combined with additional layers into a lamination stack that may be laminated into a card body. Typical materials of said substrate may be among others Polyimide, Polycarbonate, PVC, PET, but also paper or coated paper. FIG. 6 illustrates a cross-section of said card body. The number of interconnections between the fingerprint sensing module and a processing module, which may perform fingerprint feature extraction, may be as low as four, comprising supply voltage, ground potential, a data signal line and a clock signal line. The data signal line and the clock signal line may also provide alternative functionality of an interrupt request line and a reset line.

Figure 9:
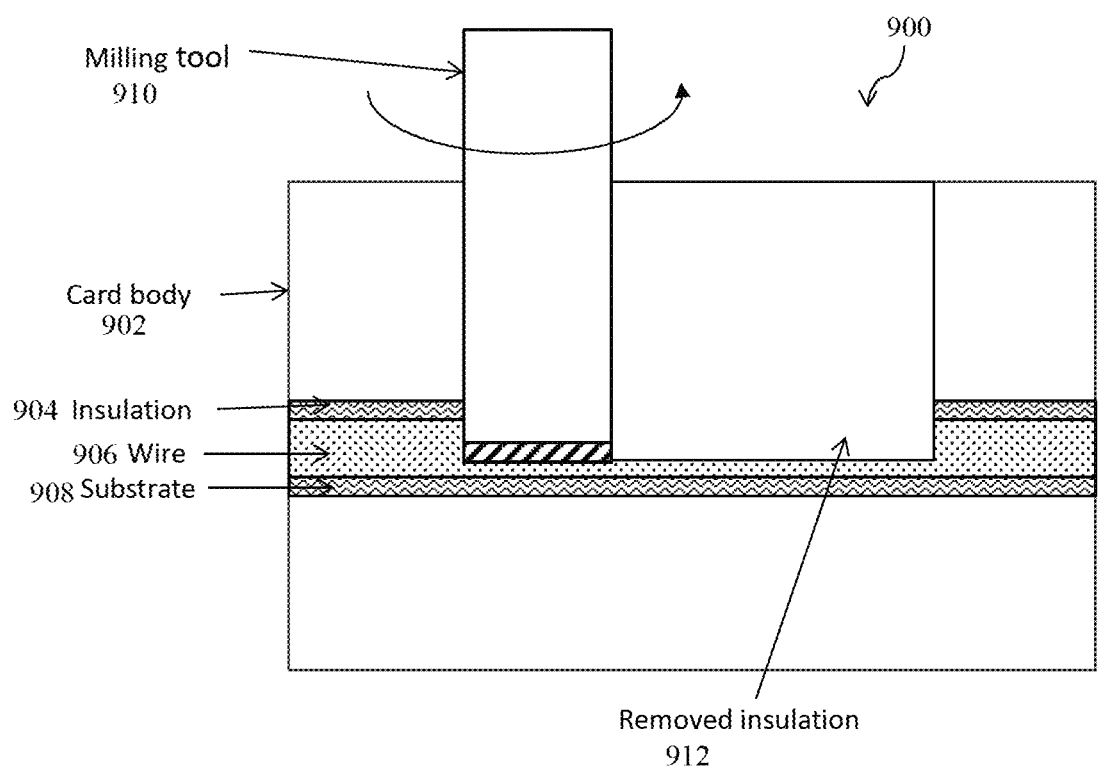
FIG. 9 shows an illustrative embodiment of a process for removing insulation.
Figure 10:
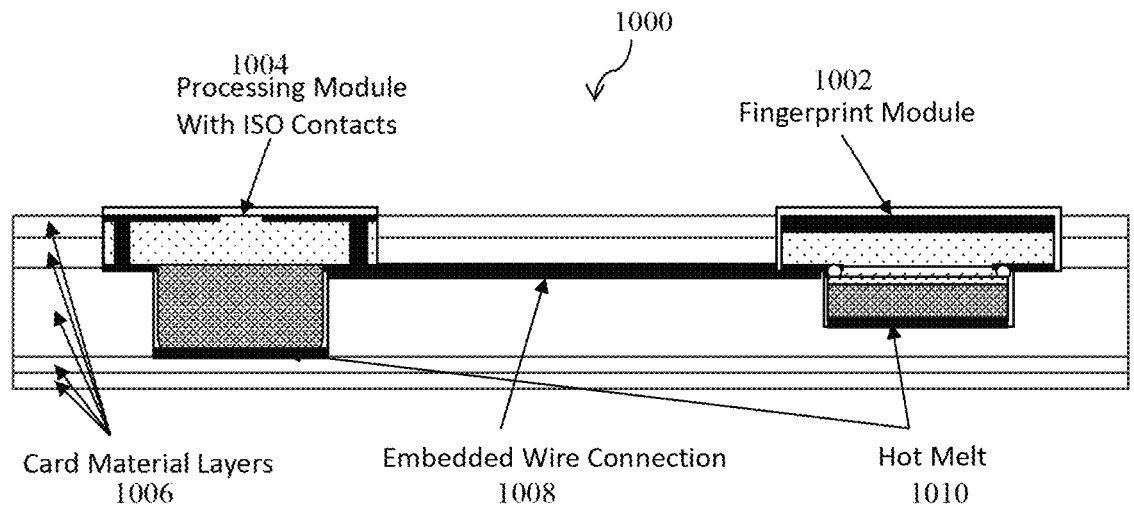
FIG. 10 shows a further cross-section of a card.
Figure 11:
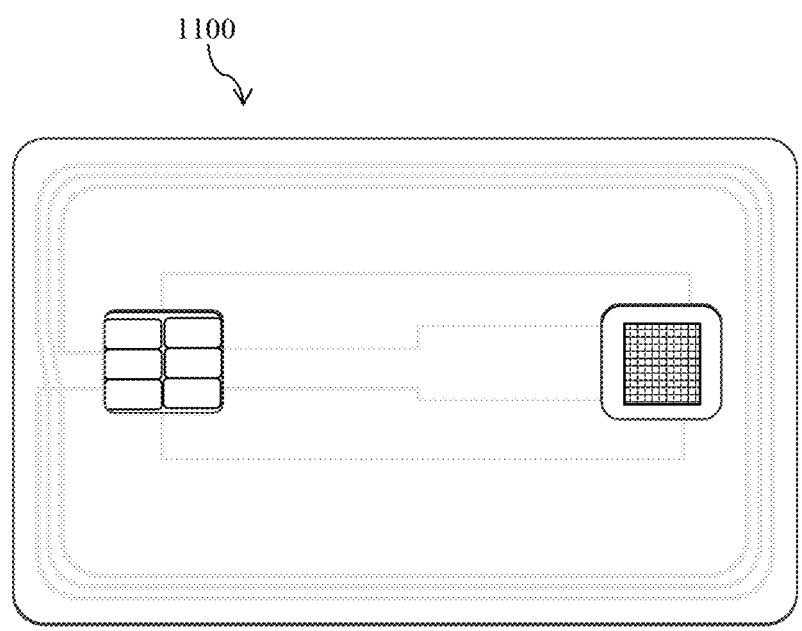
FIG. 11 shows a further illustrative embodiment of a smart card.

FIGS. 7 to 11 show different illustrative aspects of a card manufacturing process in accordance with the present disclosure. More specifically, FIG. 7 shows another cross-section 700 of a card; FIG. 8 shows another illustrative embodiment of a smart card 800; FIG. 9 shows an illustrative embodiment of a process 900 for removing insulation; FIG. 10 shows a further cross-section 1000 of a card; FIG. 11 shows a further illustrative embodiment of a smart card 1100. Cavities may be milled into the card body for accommodating the fingerprint sensor module. Milling may be done in two levels for each cavity, to form so-called T-shaped two-level cavities as illustrated in FIG. 7. The card body after applying the first milling level may be as shown in FIG. 8. The first milling level may also be utilized to remove, if required, insulation around embedded wires, as shown in FIG. 9. The endings of the interconnection wires may have a square spiral shape that, when the insulation has been removed, may provide a large contact area for interconnection to corresponding contact areas on the module substrate. The fingerprint sensor module may be inserted into the milled cavity of a smart card as illustrated in FIG. 10 and FIG. 11. Besides the fingerprint sensor module a processing module with ISO contacts on its top side may be assembled into another cavity on the same smart card.

Figure 12:
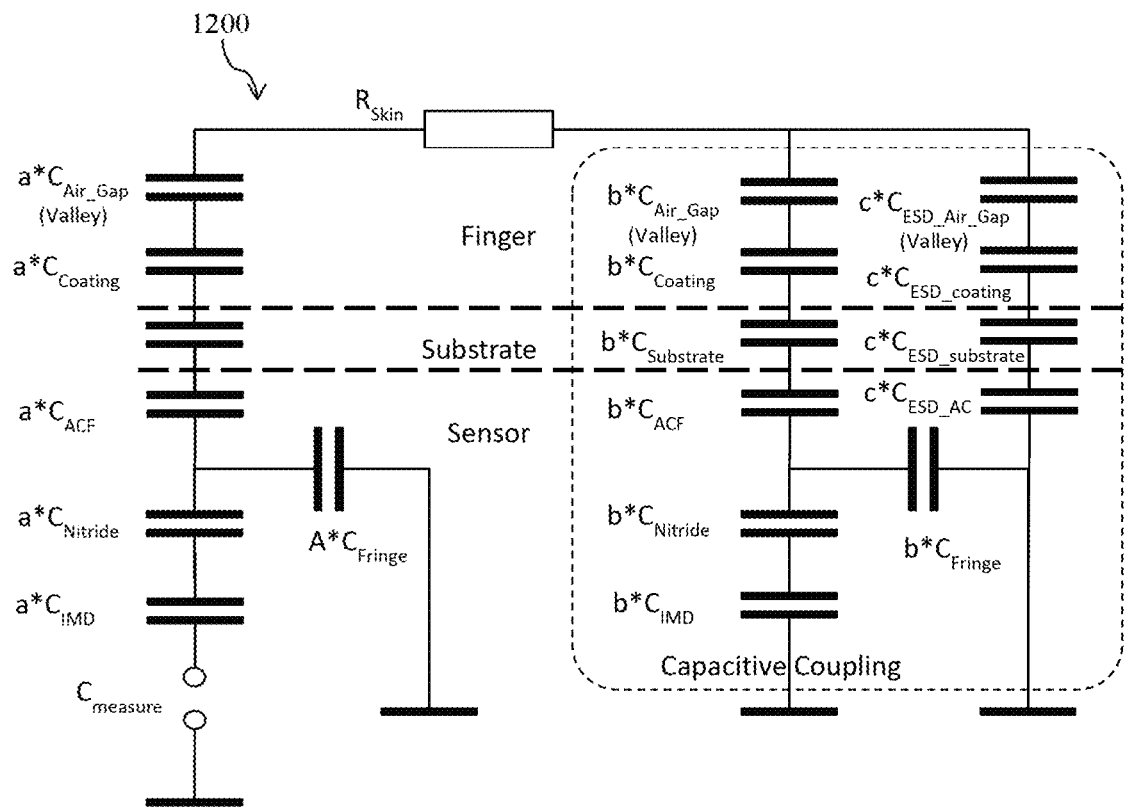
FIG. 12 shows a model of capacitances that impact sensitivity.

FIG. 12 shows a model 1200 of capacitances that impact sensitivity. As described above, a capacitive fingerprint sensor system may be utilized in which the capacitance of at least two sensor elements (i.e., sensor plates) is measured or sampled concurrently, thereby providing a sensitivity increase. The sensitivity increase approximates the amount of sensor elements being sampled concurrently. The sensitivity increase may compensate sensitivity loss by additional layers with different thicknesses added between the fingerprint sensor's sensor elements and a finger. A model of the capacitances impacting sensitivity is shown in FIG. 12. The series resistance $R_{Skin}$ may be neglected if the capacitance measurement system has enough time to settle the measurement value. Parameter a indicates the number of sensor elements that may be sampled concurrently, parameter b indicates the number of sensor elements that may not be sampled and instead may be connected to system ground potential to achieve capacitive coupling between system ground and the finger. More specifically, parameter a indicates the number of sensor elements being concurrently connected by switches to the read rail, and parameter b indicates the number of non-active sensor elements that couple the finger through closed switches to circuit ground potential. Parameter c indicates the number of coupling capacitors created by capacitive coupling of an ESD guard being positioned adjacent to every sensor element with the purpose to provide a discharge path to system ground in case of ESD stress applied through the finger.

The overview shown in FIG. 12 details from bottom to top capacitive layers of: inter-metal-deposition (IMD) between a first metal layer utilized for a sensor capacitor plate and a second metal layer utilized for an ESD protection grid, which is above the first metal layer; nitride layer which is formed by a $Si_3N_4$-layer applied on the die surface for protection; anisotropic conductive foil (ACF) layer utilized to assemble the sensor die to the interconnection substrate, which is synonymous for the layer being required to mount the fingerprint sensor die to the substrate including underfill if required; substrate which acts as an interposer; coating layer providing scratch resistance and mechanical protection; an air gap composed of the distance from coating surface to opposing finger topology. The total capacitance between a sensor element (i.e. a sensor capacitor plate) and system ground may be measured between the nodes $C_{measure}$.

It may be assumed that the valley depth of a human finger is approximately 20 µm. Relative dielectric constants may be assigned to the various layers, depending on the material of which they are composed. In the following, the indicated thicknesses are corrected by application of their relative dielectric constants to calculate a distance that an air gap with similar capacitive properties would have. This calculated air gap is referred to as comparable air gap. As an example, a dielectric constant of e.g. 3 would correct a 150 µm thick polycarbonate substrate to a comparable air gap of 50 um. An overview of exemplary layer thicknesses, material, dielectric constants and calculated air gap providing similar capacitance as the layer is given in Table 1. Individual calculated air gaps may be summed up to form a comparable air gap. The comparable air gap may be used to calculate one capacitor being series-connected with the plate to finger capacitance to provide an analytical approach to determine the resulting series capacitance.

TABLE 1

| Layer | Thickness | Material | Eps_r | Air Gap |
| --- | --- | --- | --- | --- |
| Coating | 10.0 µm | Polymer | 3.5 | 2.9 µm |
| Substrate | 75.0 µm | PVC | 3.5 | 21.4 µm |
| ACF | 20.0 µm | Polymer | 3.5 | 5.7 µm |
| Nitride | 1.5 µm | $Si_3N_4$ | 7.5 | 0.2 µm |
| IMD | 3.0 µm | $Si_3N_4$ | 7.5 | 0.4 µm |
| Comparable Air Gap | | | | 30.6 µm |

The layer stack shown Table 1 yields a comparable air gap of 30.6 µm. The series-connected capacitance $C_{ser}$ of sensor plate to finger ($C_{finger}$) and comparable air gap ($C_{air\_gap}$) may be calculated as $$C_{ser}=(C_{ser}*C_{air\_gap})/(C_{ser}+C_{air\_gap})$$

Figure 13:
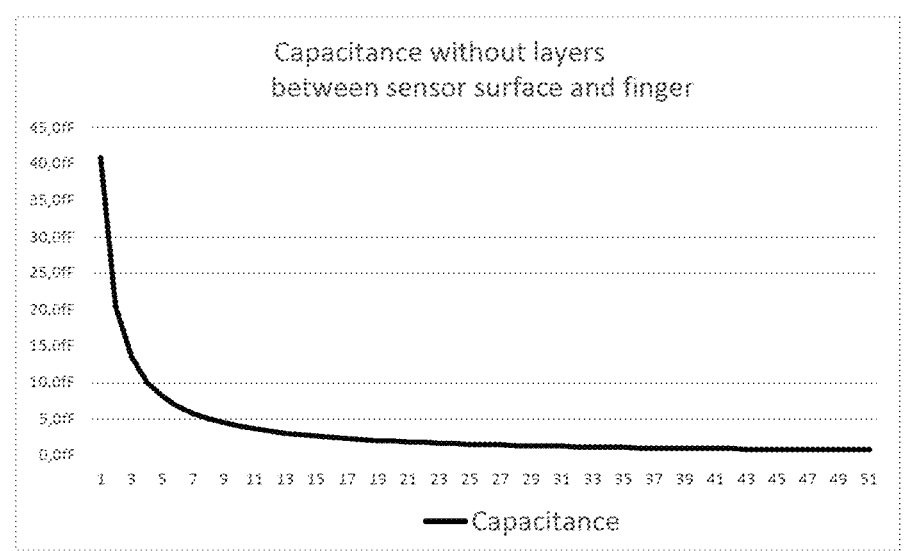
FIG. 13 shows first capacitance measurement.
Figure 14:
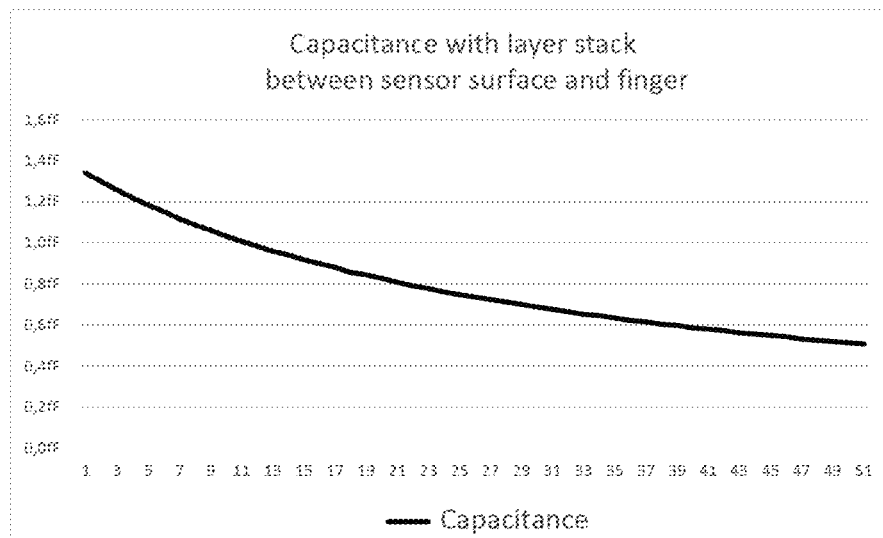
FIG. 14 shows a second capacitance measurement.
Figure 15:
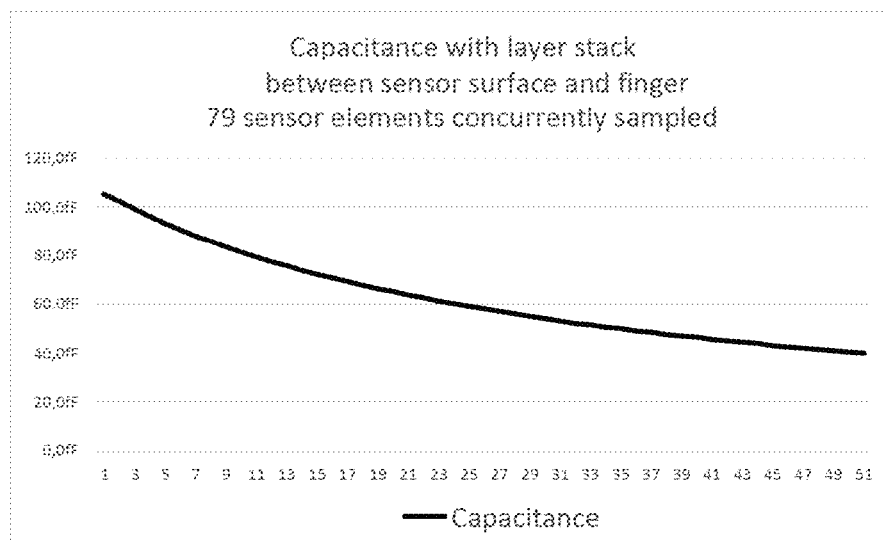
FIG. 15 shows a third capacitance measurement.

FIGS. 13 to 15 show different capacitance measurements. As the relationship between capacitance and air gap is reciprocal, the impact of 30.6 µm additional air gap is significant. From an electrical perspective, the additional air gap may reduce the overall capacitance, which may result in an attenuated voltage after for example capacitance-to-voltage conversion. Because the comparable air gap may be regarded as a capacitance that is series-connected with the sensor plate capacitance it may significantly linearize the series capacitance. The sensor plate to finger capacitance without any additional layer is shown in FIG. 13 for a sensor plate size of 68*68 µm² and for a finger valley depth of 1 µm to 51 µm (offset of 1 µm to avoid division by 0).

The sensor plate to finger capacitance considering the layer stack of Table 1 is shown in FIG. 14 for a sensor plate size of 68*68 µm and for a finger valley depth of 0 µm to 50 µm. The capacitance shown in FIG. 14 may be low compared to parasitic capacitances that are present in the capacitance measurement system and may hence have a negative impact on the measurement resolution. In imaging devices, the sensing capacitances are often measured by sequentially addressing and measuring individual capacitances in a line-scan manner. To meet the requirement to have a high sensitivity combined with high parasitic capacitance suppression the presently disclosed fingerprint module concurrently measures capacitances on subsets of sensor elements. Thus, a sampling scheme is used wherein multiple sensor elements are evaluated concurrently, or in other words, a sum of sensor element capacitances is sampled instead of individual sensor element capacitances.

For instance, a row-by-row sampling scheme may be applied to a capacitive fingerprint sensor element array of 80*80 pixels (each sensor element corresponding to a pixel), wherein 79 sensor elements are sampled concurrently, forming the sum of 79 capacitances. Sampling of 79 sensor elements may be repeated 80 times, wherein not any combination of sampled sensor elements may be the same for any of the 80 concurrent samplings. Then, 80 sums of sampled capacitances may form a linear equation system with 80 equations, 80 variables and linear coefficients that may either be 1 (=sampled) or 0 (=not sampled), and which may be resolved by a calculation executed on a suitable microcontroller unit. This calculation yields the individual capacitances (i.e., the variables) of all 80 sensor elements. The thus enhanced capacitance of a single sensor element is shown in FIG. 15.

In an embodiment, the substrate is utilized to mount additional components next to the fingerprint sensor die. The additional components may be other silicon dies as well as surface mount devices. Furthermore, in an embodiment, the sensor die and additional components, if any, may be covered by a mold compound, thus providing additional mechanical protection to the over-molded components.

FIG. 16 shows an illustrative embodiment of a tape 1600 with sensor dies. In an embodiment, multiple sensor dies may be provided on a 35 mm-wide tape made of, for example, PVC. Said tape may further have index holes that enable precise transportation of said tape, similar to analog 35 mm movie tape. A punching tool may be configured to punch one assembly comprising one fingerprint sensor to the punched-out tape. FIG. 16 provides a top view of the tape with one position 1602 being punched out. Another tool may be configured to assemble said assembly into a matching cavity of a smart card.

Figure 17:
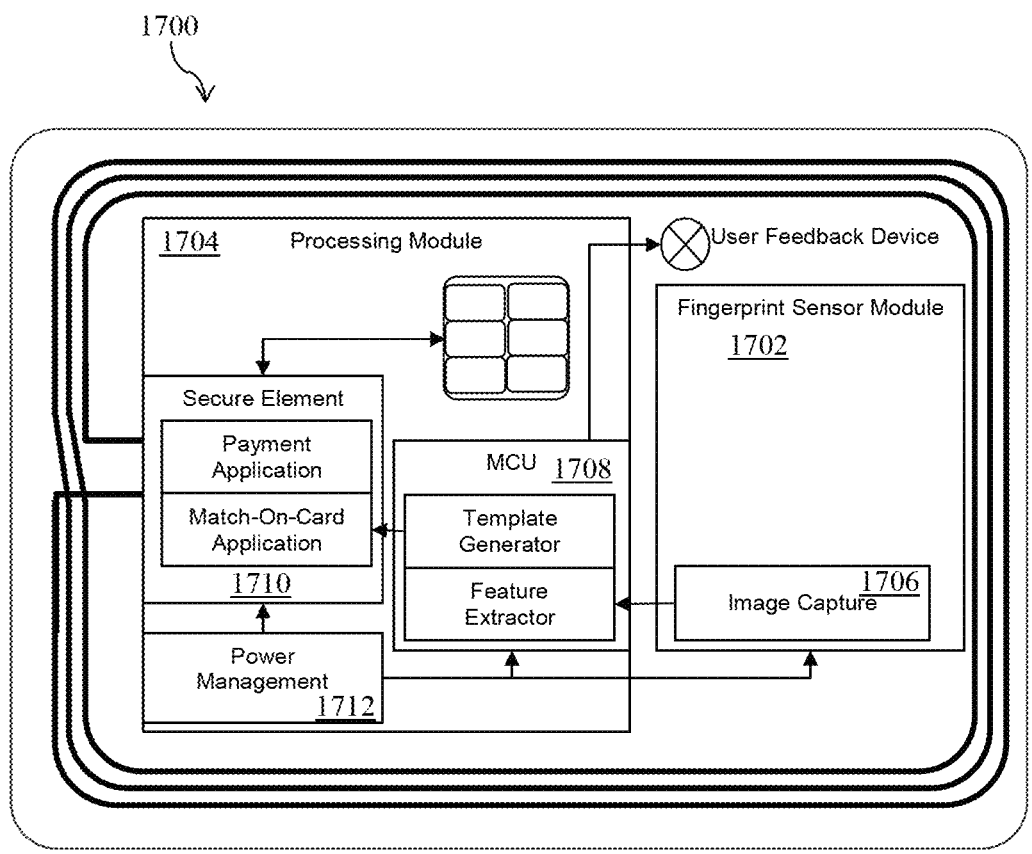
FIG. 17 shows a further illustrative embodiment of a smart card.

FIG. 17 shows a further illustrative embodiment of a smart card 1700. In particular, it shows how a fingerprint sensor module 1702 of the kind set forth may functionally be integrated into a smart card 1700. The fingerprint sensor module 1702 is embedded into a smart card 1700 together with a processing module 1704 that may perform different functions. The processing module 1704 comprises a processing unit (i.e., microcontroller) 1708, a secure element 1710, and a power management unit 1712. The image capture unit 1706 of the fingerprint sensor module 1704 is configured to concurrently measure capacitances on subsets of sensor elements (not shown). The secure element 1710 may execute a payment application requesting authentication from a fingerprint-match-on-card application, wherein said fingerprint-match-on card application communicates with the MCU 1708 to obtain a fingerprint feature list for matching against a fingerprint reference feature list that is securely stored in the secure element 1710. The MCU 1708 communicates with the fingerprint sensor module 1702 with the purpose to receive an electronic representation of a fingerprint pattern. The MCU 1708 is further configured to process said electronic representation of a fingerprint pattern with the purpose to extract features from said representation and converting them into said feature list in machine-readable format. The MCU 1708 may furthermore provide user feedback through a user feedback device, to guide the fingerprint imaging process. The secure element 1710 may communicate through an ISO-7816 and/or ISO-14443 interface with a payment network and/or an identification network.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 fingerprint sensor module
102 substrate
104 fingerprint sensor
200 fingerprint processing module
202 sensor elements
204 nitride layer
206 glue layer
208 substrate
210 air gap
300 fingerprint processing system
302 fingerprint sensor module
304 set of sensor elements
306 measurement unit
308 processing unit
310 fingerprint processing method
312 measurement unit concurrently measures capacitances on subsets of the set of sensor elements
314 processing unit processes the concurrently measured capacitances
316 switched capacitor integrator
318 operational transconductance amplifier (OTA)
320 select switches
322 pre-charge switches
324 reference voltage source
326 pre-charge voltage source
328 signal-to-data conversion unit
330 sampling principle
332 evaluation of single sensor plates
334 concurrent evaluation of sensor plates
400 fingerprint sensor module
402 polymer substrate
404 die
406 active sensor area
408 stud-/gold-bumps
410 interconnectivity layer
412 anisotropic conductive film (ACF)
414 fingerprint sensor module
416 finger
418 print bottom substrate
420 core
422 interconnection substrate
424 print top substrate
426 (flex-)bump
500 substrate
502 wire reservoir
504 computer-controlled nozzle
506 smart card
600 cross-section of card
602 card material layers
604 embedded wire connection
606 interconnection layer
700 cross-section of card
702 milling tool
704 T-shape milling
706 milled T-shaped cavity
708 embedded wire connection
800 smart card
900 insulation removal
902 card body
904 insulation
906 wire 908 substrate
1000 cross-section of card
1002 fingerprint module
1004 processing module with ISO contacts
1006 card material layers
1008 embedded wire connection
1100 smart card
1200 model
1600 tape
1602 position
1700 smart card
1702 fingerprint sensor module
1704 processing module
1706 image capture unit
1708 microcontroller unit
1710 secure element
1712 power management unit

The invention claimed is:

1. A fingerprint sensor module comprising:
a substrate; and
a fingerprint sensor mounted on one side of the substrate and including a set of sensor circuits having capacitive elements and including a measurement circuit, the measurement circuit being configured to concurrently measure capacitances of mutually different subsets of the sensor circuits in the set of sensor circuits, and to ascertain capacitances of each individual sensor circuit within the set based on the concurrently-measured capacitances of the sensor circuits in the mutually different subsets.

2. The module of claim 1, wherein the substrate and the fingerprint sensor form a T-shaped assembly.

3. The module of claim 1, wherein the substrate is a polymer substrate or a glass substrate.

4. The module of claim 1, further comprising a coating on the substrate.

5. The module of claim 1, wherein the fingerprint sensor is attached to the substrate by a solder layer, an electroplating layer, or a foil.

6. The module of claim 1, wherein the measurement circuit comprises a switched capacitor integrator.

7. The module of claim 1, wherein the measurement circuit is configured to sequentially measure the capacitances on the mutually different subsets of the set of sensor circuits.

8. A fingerprint processing system comprising the module of claim 1, and a processing circuit configured to process the concurrently measured capacitances.

9. The system of claim 8, wherein the processing circuit-is further configured to derive a capacitance on one or more individual sensor circuits from said concurrently measured capacitances.

10. The system of claim 8, wherein the processing circuit is a microcontroller, and wherein each of the sensor circuits includes at least one circuit elements to sense a change in capacitance.

11. A smart card comprising the system of claim 8.

12. The smart card of claim 11, further comprising a plurality of wires embedded in a layer of said card, wherein said wires connect the fingerprint processing module with other components of the card.

13. The card of claim 12, wherein one or more endings of said wires have a square spiral shape.

14. A method of producing a fingerprint sensor module, the method comprising providing the module with:
a substrate; and
a fingerprint sensor mounted on one side of the substrate and including a set of sensor circuits having capacitive elements and including a measurement-circuit, the measurement circuit being configured to concurrently measure capacitances of mutually different subsets of the set of sensor circuits and to ascertain capacitances of individual ones of the sensor circuits, based on the sum of the measured capacitances for each of the subsets, wherein the fingerprint sensor is configured and arranged to:
sequentially measure capacitances of a plurality of the subsets, each subset including a different combination of ones of the sensor circuits relative to the other subsets, each capacitance measurement providing a combined capacitance value for all of the sensor circuits in the subset; and
derive individual capacitance values for each of the sensor circuits, based upon the respective capacitance measurements for the plurality of subsets.

15. A fingerprint sensor module comprising:
a substrate; and
a fingerprint sensor mounted on one side of the substrate and including a set of sensor circuits having capacitive elements and including a measurement circuit, the measurement circuit being configured to concurrently measure capacitances of mutually different subsets of the set of sensor circuits, and to ascertain capacitances of individual ones of the sensor circuits based on the measured capacitances of the mutually different subsets, wherein the fingerprint sensor is configured and arranged to:
sequentially measure capacitances of a plurality of the subsets, each subset including a different combination of ones of the sensor circuits relative to the other subsets, each capacitance measurement providing a combined capacitance value for all of the sensors in the subset; and
derive individual capacitance values for each of the sensor circuits, based upon the respective capacitance measurements for the plurality of subsets.

16. The module of claim 1, wherein the fingerprint sensor is configured and arranged to:
sample capacitances of an array of the sensor circuits by measuring, for each subset, combined capacitances of the sensor circuits in the subset, each subset including a different combination of the sensor circuits; and
assess individual capacitances of the sensor circuits based on the sampled capacitances for each respective subset.

17. The module of claim 1, wherein:
the fingerprint sensor is embedded between lower and upper surfaces of a smart card, wherein the substrate forms part of the upper surface; and
the substrate is configured and arranged to insulate the fingerprint sensor from a user's finger placed on the substrate.

18. A fingerprint sensor module comprising:
a substrate; and
a fingerprint sensor mounted on one side of the substrate and including a set of sensor circuits having capacitive elements and including a measurement circuit, the measurement circuit being configured to concurrently measure respective capacitances of and associated with respective subsets of the set of sensor circuits, and to ascertain capacitances of each individual one of the sensor circuits in the set based on the measured respective capacitances of the different subsets, wherein each of the sensor circuits includes at least one circuit element to sense a change in capacitance, the substrate is arranged as a layer adjacent to another layer that includes the fingerprint sensor, and wherein the measurement circuit includes a sampler circuit and switched capacitor integrator configured to sample and measure the respective capacitances.

19. The module of claim 18, wherein the switched capacitor integrator of the measurement circuit further includes an operational transconductance amplifier.

* * * * *